(12) United States Patent
Zhang

(10) Patent No.: US 11,892,725 B2
(45) Date of Patent: Feb. 6, 2024

(54) DISPLAY PANEL AND DISPLAY DEVICE

(71) Applicant: WUHAN CHINA STAR OPTOELECTRONICS TECHNOLOGY CO., LTD., Hubei (CN)

(72) Inventor: Pengfei Zhang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 853 days.

(21) Appl. No.: 16/957,311

(22) PCT Filed: Nov. 12, 2019

(86) PCT No.: PCT/CN2019/117284
§ 371 (c)(1),
(2) Date: Jun. 23, 2020

(87) PCT Pub. No.: WO2021/031396
PCT Pub. Date: Feb. 25, 2021

(65) Prior Publication Data
US 2023/0118724 A1    Apr. 20, 2023

(30) Foreign Application Priority Data
Aug. 22, 2019 (CN) .......................... 201910777357.3

(51) Int. Cl.
*G02F 1/1335* (2006.01)

(52) U.S. Cl.
CPC .. *G02F 1/133533* (2013.01); *G02F 1/133548* (2021.01)

(58) Field of Classification Search
CPC ......... G02F 1/133533; G02F 1/133548; G02F 1/133565
See application file for complete search history.

(56) References Cited

U.S. PATENT DOCUMENTS

| | | |
|---|---|---|
| 9,575,356 B2 | 2/2017 | Nam |
| 2013/0300986 A1* | 11/2013 | Kang .................. G02B 5/3058 29/829 |
| 2018/0335882 A1 | 11/2018 | Yoon et al. |
| 2018/0341149 A1 | 11/2018 | Chen |
| 2019/0086721 A1 | 3/2019 | Lin et al. |

FOREIGN PATENT DOCUMENTS

| | | |
|---|---|---|
| CN | 102636897 A | 8/2012 |
| CN | 105954921 A | 9/2016 |
| CN | 106125185 A | 11/2016 |

(Continued)

*Primary Examiner* — Nathanael R Briggs
(74) *Attorney, Agent, or Firm* — PV IP PC; Wei Te Chung; Zhigang Ma

(57) ABSTRACT

The present application provides a display panel and a display device. The display panel includes sub-pixels with multiple colors and upper polarizing units with various structures. The upper polarizing units with the various structures are disposed one-to-one correspondence with the sub-pixels with the multiple colors to increase transmittance of transmitted light of each color through the upper polarizing units corresponding to the sub-pixels whose color is the same as the color of the upper polarizing units.

15 Claims, 4 Drawing Sheets

(56) References Cited

FOREIGN PATENT DOCUMENTS

| CN | 106249337 A | * | 12/2016 | ........... G02B 5/3058 |
|----|-------------|---|---------|------------------------|
| CN | 106249337 A |   | 12/2016 |                        |
| CN | 106842677 A |   | 6/2017  |                        |
| CN | 107121832 A |   | 9/2017  |                        |
| CN | 107203065 A |   | 9/2017  |                        |
| CN | 107632449 A |   | 1/2018  |                        |
| CN | 107908037 A |   | 4/2018  |                        |

* cited by examiner

DISPLAY PANEL AND DISPLAY DEVICE

FIELD OF APPLICATION

The present application is related to the field of display panel technology, and specifically to a display panel and a display device.

BACKGROUND OF APPLICATION

Statements herein merely provide background information related to the present application and do not necessarily constitute prior art.

Currently, a liquid crystal display is composed of two parts: a backlight module and a liquid crystal cell. The backlight module includes a backlight source, a light guide plate, a diffusion plate, etc. The liquid crystal cell includes a lower polarizer, a color filter, liquid crystals, a thin-film transistor (TFT) glass, and an upper polarizer, etc. However, a traditional polarizer is an absorption type. It only allows light of one orthogonal polarization direction to pass, and light of another polarization direction is absorbed, greatly reducing an overall backlight transmittance. After the backlight source is absorbed or reflected by a medium of each layer, light energy loss reaches 95%, and transmission loss is mainly due to an absorption of the polarizer. In addition, material of the traditional polarizer includes a protective layer, a polyvinyl alcohol (PVA) layer, a cellulose triacetate (TAC) layer, a pressure-sensitive adhesive (PSA), a compensation film, and a release film. Compared to display devices for special occasions, more stringent reliability requirements are required, and this subjects the polarizer to failure.

With development of nanoimprint lithography, people have begun to produce subwavelength grating structures to achieve polarization of light in a visible wavelength range. The so-called subwavelength grating refers to a grating whose grating period is much less than a wavelength of incident light. The subwavelength grating structure has a high extinction ratio for light fields of a transverse magnetic (TM) field and a transverse electric (TE) field, which can significantly transmit TM light perpendicular to a direction of an arrangement of metal lines and reflect TE light parallel to the direction of the arrangement of the metal lines, so that it can be used as a high transmittance polarizer structure. Compared to the traditional polarizers, the subwavelength grating structures have advantages of high transmittance and high contrast, but they cannot satisfy optimal transmittance of three primary colors of RGB (red, green, and blue) when they are applied to the liquid crystal displays, which affects an overall light transmission effect of the liquid crystal displays.

SUMMARY OF APPLICATION

The present application provides a display panel and a display device, which dispose upper polarizing units with different structures corresponding to sub-pixels with different colors and solve technical problems of that a display panel cannot satisfy optimal transmittance of transmitted light of different colors and affects an overall light transmission effect of liquid crystal displays.

In order to solve the above problems, the present application provides technical solutions as follows.

The present application provides a display panel including sub-pixels with multiple colors and upper polarizing units with various structures. The upper polarizing units with the various structures are disposed one-to-one correspondence with the sub-pixels with the multiple colors to increase transmittance of transmitted light of each color through the upper polarizing units corresponding to the sub-pixels whose color is the same as the color of the upper polarizing units.

In the display panel provided by an embodiment of the present application, the display panel further includes lower polarizing units with various structures. The lower polarizing units with the various structures are disposed one-to-one correspondence with the sub-pixels with the multiple colors. The upper polarizing units and the lower polarizing units are respectively disposed on two sides of corresponding sub-pixels, or the upper polarizing units and the lower polarizing units are respectively disposed on a same side of corresponding sub-pixels, and the upper polarizing units are disposed near the sub-pixels.

In the display panel provided by an embodiment of the present application, the upper polarizing units and the lower polarizing units have a same structure, and transmission axes of the upper polarizing units and the lower polarizing units are perpendicular to each other.

In the display panel provided by an embodiment of the present application, the upper polarizing units include a subwavelength nano-grating structure. The upper polarizing units with the various structures are different in at least one of a grating period, a grating duty ratio, or a grating height.

In the display panel provided by an embodiment of the present application, the grating period ranges from 120 to 500 nanometers, the grating duty ratio ranges from 0.3 to 0.7, and the grating height ranges from 100 to 300 nanometers.

In the display panel provided by an embodiment of the present application, projections of the upper polarizing units and the lower polarizing units in a direction perpendicular to the display panel completely cover projections of the corresponding sub-pixels in the direction perpendicular to the display panel.

In the display panel provided by an embodiment of the present application, the sub-pixels with the multiple colors include a red sub-pixel, a green sub-pixel, and a blue sub-pixel. The upper polarizing units with the various structures include a first upper polarizing unit, a second upper polarizing unit, and a third upper polarizing unit.

The first upper polarizing unit is disposed corresponding to the red sub-pixel, and transmittance of red transmitted light through the first upper polarizing unit is greater than transmittance of green transmitted light and blue transmitted light through the first upper polarizing unit.

The second upper polarizing unit is disposed corresponding to the green sub-pixel, and transmittance of green transmitted light through the second upper polarizing unit is greater than transmittance of red transmitted light and blue transmitted light through the second upper polarizing unit.

The third upper polarizing unit is disposed corresponding to the blue sub-pixel, and transmittance of blue transmitted light through the third upper polarizing unit is greater than transmittance of red transmitted light and green transmitted light through the third upper polarizing unit.

In the display panel provided by an embodiment of the present application, the first upper polarizing unit, the second upper polarizing unit, and the third upper polarizing unit include a subwavelength nano-grating structure. A grating period of the first upper polarizing unit is 200 nanometers, a grating duty ratio thereof is 0.6, and a grating height thereof is 260 nanometers. A grating period of the second upper polarizing unit is 200 nanometers, a grating duty ratio thereof is 0.5, and a grating height thereof is 260 nanometers. A grating period of the third upper polarizing unit is 200 nanometers, a grating duty ratio thereof is 0.5, and a grating height thereof is 270 nanometers.

In the display panel provided by an embodiment of the present application, material of the subwavelength nano-grating structure includes a metal or a metal oxide.

In the display panel provided by an embodiment of the present application, the display panel further includes a first substrate and a second substrate opposite to each other. The sub-pixels with the multiple colors are disposed on a side of the first substrate near the second substrate. The upper polarizing units with the various structures are disposed on a side of the sub-pixels with the multiple colors near the second substrate. The lower polarizing units with the various structures are disposed on a side of the second substrate away from the first substrate.

In the display panel provided by an embodiment of the present application, the display panel further includes a liquid crystal layer, a thin-film transistor (TFT) array layer, and a protective layer. The protective layer is disposed between the sub-pixels and the upper polarizing units. The TFT array layer is disposed on a side of the second substrate near the first substrate. The liquid crystal layer is disposed between the upper polarizing units and the TFT array substrate.

The present application further provides a display panel including sub-pixels with multiple colors, upper polarizing units with various subwavelength nano-grating structures, and lower polarizing units with various subwavelength nano-grating structures.

The upper polarizing units with the various subwavelength nano-grating structures are different in at least one of a grating period, a grating duty ratio, and a grating height. The upper polarizing units with the various subwavelength nano-grating structures are disposed one-to-one correspondence with the sub-pixels with the multiple colors to increase transmittance of transmitted light of each color through the upper polarizing units corresponding to the sub-pixels whose color is the same as the color of the upper polarizing units.

The lower polarizing units with the various subwavelength nano-grating structures are disposed one-to-one correspondence with the sub-pixels with the multiple colors. The lower polarizing units and corresponding upper polarizing units have a same structure, transmission axes of the upper polarizing units and the lower polarizing units are perpendicular to each other. The lower polarizing units are disposed on a side of the upper polarizing units away from the sub-pixels.

The present application further provides a display device including the above-mentioned display panel and a backlight module disposed corresponding to the display panel. The backlight module is configured to provide a light source of the transmitted light to the display panel.

In the display device provided by an embodiment of the present application, the display panel further includes lower polarizing units with various structures. The lower polarizing units with the various structures are disposed one-to-one correspondence with the sub-pixels with the multiple colors. The upper polarizing units and the lower polarizing units are respectively disposed on two sides of corresponding sub-pixels, or the upper polarizing units and the lower polarizing units are respectively disposed on a same side of corresponding sub-pixels, and the upper polarizing units are disposed near the sub-pixels.

In the display device provided by an embodiment of the present application, structures of the upper polarizing units and the lower polarizing units are a same, and transmission axes of the upper polarizing units and the lower polarizing units are perpendicular to each other.

In the display device provided by an embodiment of the present application, the upper polarizing units include a subwavelength nano-grating structure. The upper polarizing units with the various structures are different in at least one of a grating period, a grating duty ratio, or a grating height.

In the display device provided by an embodiment of the present application, the lower polarizing units are disposed near the backlight module.

Beneficial effects of the present application are that the present application provides the upper polarizing units with the various structures for the display panel, and the upper polarizing units with the various structures are disposed one-to-one correspondence with the sub-pixels with the multiple colors. A structure design of the upper polarizing units according to the corresponding sub-pixels with different colors can increase the transmittance of the transmitted light of each color through the upper polarizing units corresponding to the sub-pixels whose color is the same as the color of the upper polarizing units. This ensures that the transmitted light of the same color corresponding to each color of each of the sub-pixels has high transmittance. Therefore, transmittance of each monochromatic transmitted light of the display panel (such as the three primary colors of red, green, and blue) is higher, thereby increasing an overall light transmission effect of the display panel. The upper polarizing units include the subwavelength nano-grating structure. The subwavelength nano-grating structure with better transmittance and extinction ratio are configured as the upper polarizing units for sub-pixels of different colors to ensure that the transmitted light of each color has high transmittance when passing through the upper polarizing unit corresponding to the sub-pixel of the same color so as to that increase the overall light transmission effect of the display panel.

DESCRIPTION OF DRAWINGS

In order to describe technical solutions in the present application clearly, drawings to be used in the description of embodiments will be described briefly below. Obviously, drawings described below are only for some embodiments of the present application, and other drawings may be obtained by those skilled in the art based on these drawings without creative efforts.

DETAILED DESCRIPTION OF PREFERRED EMBODIMENTS

Figure 1:
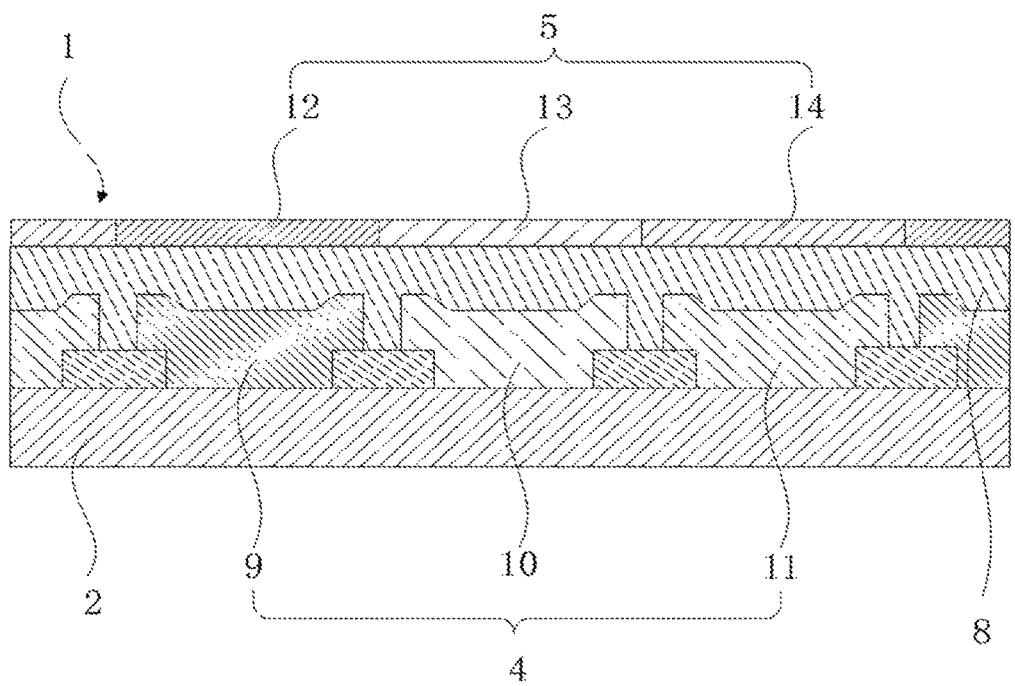
FIG. 1 is a partial structural diagram of a display panel provided by an embodiment of the present application.

Embodiments of the present application are described detailly below. Examples of the embodiments are shown in the drawings, and units of the same or similar functions are using the same or similar numeral to represent. Embodiments reference to the appended drawings are used to describe and understand the present application, not to limit the present application.

Examples are described below with reference to the appended drawings, and the drawings illustrate particular embodiments in which the present application may be practiced. Directional terms mentioned in the present application, such as center, transverse, upper, lower, left, right, vertical, horizontal, top, bottom, in, out, etc., only refer to directions in the accompanying drawings. Thus, the adoption of directional terms is used to describe and understand the present application, but not to limit the present application. In addition, the terms first and second are merely used for illustrative purposes only, but are not to be construed as indicating or imposing a relative importance or implicitly indicating the number of technical features indicated. Thus, a feature that defines "first" or "second" may expressly or implicitly include one or more of the features. In the description of the present application, the meaning of plural is two or more, unless otherwise specified. In addition, the terms "including" and any variations thereof are intended to cover a non-exclusive inclusion.

In the present application, unless otherwise specifically stated and defined, terms "connected", "fixed", etc. should be interpreted expansively. For example, "fixed" may be fixed connection, also may be detachable connection, or integration; may be mechanical connection, also may be electrical connection; may be direct connection, also may be indirect connection through an intermediate, and may be internal communication between two elements or interaction of two elements, unless otherwise specifically defined. The ordinary skill in this field can understand the specific implication of the above terms in the present application according to specific conditions.

The terminology used herein is for the purpose of describing particular embodiments only and is not intended to limit the exemplary embodiments. Unless the context clearly dictates otherwise, the singular forms "a" and "an", as used herein, are also intended to include the plural. It should also be understood that the terms "include" and/or "include" both mean a presence of characteristics, integers, steps, operations, units and/or components stated in the specification, and do not exclude the presence or addition of one or more other features, integers, operations, units, components and/or combinations thereof.

The present application is further described below with reference to the drawings and embodiments.

Figure 2:
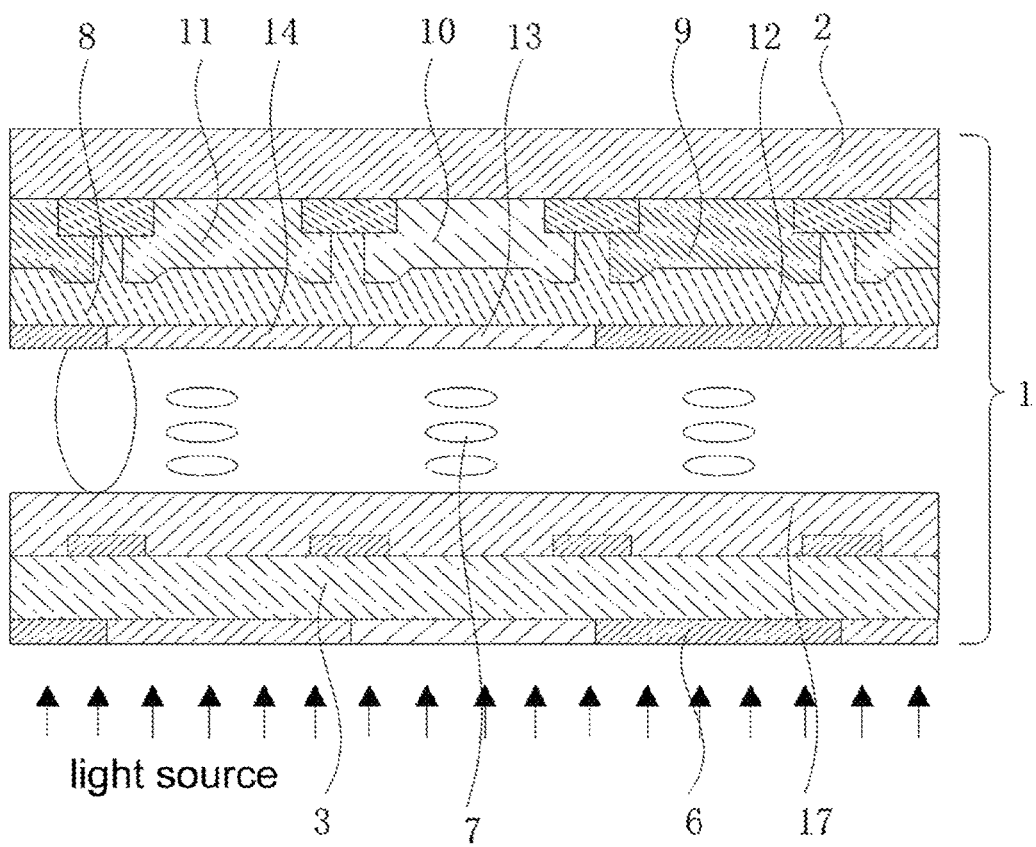
FIG. 2 is a structural diagram of the display panel provided by an embodiment of the present application.

As shown in FIGS. 1 and 2, an embodiment of the present application provides a display panel 1 including a first substrate 2 and a second substrate 3 opposite to each other, sub-pixels 4 (color resist layer) with multiple colors, upper polarizing units 5 with various structures, and lower polarizing units 6 with various structures. The sub-pixels 4 with the multiple colors are disposed on a side of the first substrate 2 near the second substrate 3. The upper polarizing units 5 with the various structures are disposed on a side of the sub-pixels 4 with the multiple colors near the second substrate 3. The lower polarizing units 6 with the various structures are disposed on a side of the second substrate 3 away from the first substrate 2. The upper polarizing units 5 with the various structures and the lower polarizing units 6 with the various structures are disposed one-to-one correspondence with the sub-pixels 4 with the multiple colors. The upper polarizing units 5 and the lower polarizing units 6 corresponding to the upper polarizing units 5 have a same structure. Transmission axes of the upper polarizing units 5 and the lower polarizing units 6 are perpendicular to each other. Each structure of the upper polarizing units 5 is configure according to the corresponding sub-pixels 4 (e.g., each of the sub-pixels 4 of each color corresponds to transmitted light in a fixed wavelength), which can increase transmittance of the transmitted light of each color through the upper polarizing units 5 corresponding to the sub-pixels 4 whose color is the same as the color of the upper polarizing units 5.

Specifically, a liquid crystal layer 7 is further disposed between the first substrate 2 and the second substrate 3. A light source is irradiated from the second substrate 3 to the liquid crystal layer 7 and the first substrate 2. The lower polarizing units 6 are disposed on the second substrate 3 and is configured to convert the light source to polarized light. The upper polarizing units 5 are disposed on a side of the liquid crystal layer 7 away from the second substrate 3 and is configured to analyze the polarized light electrically modulated by the liquid crystal layer 7 to form light-dark contrast, thereby generating display images.

Specifically, the first substrate 2 and the second substrate 3 can be glass substrates. the sub-pixels 4 with the multiple colors are disposed on a side of the first substrate 2 near the liquid crystal layer 7. A protective layer 8 is further disposed on a side of the sub-pixels 4 with the multiple colors near the liquid crystal layer 7. The upper polarizing units 5 with various structures are disposed on the protective layer 8. Of course, the upper polarizing units 5 with various structures can be disposed on a side of the first substrate 2 away from the liquid crystal layer 7, which is not limited herein. A light-shielding layer (black matrix) is disposed between any two adjacent sub-pixels 4, and the sub-pixels 4 partially covers the light-shielding layer. A thin-film transistor layer 17 is further disposed on a side of the second substrate 3 near the liquid crystal layer 7.

Specifically, the first substrate 2 is a base substrate of a color filter substrate, and the corresponding second substrate 3 is a base substrate of an array substrate. Of course, the sub-pixels 4 with the multiple colors can be disposed on the side of the second substrate 3 near the liquid crystal layer 7. At this time, the upper polarizing units 5 are disposed on the side of the first substrate 2 near the liquid crystal layer 7 or is disposed on a side of the first substrate 2 away from the liquid crystal layer 7. The first substrate 2 is a base substrate of a common substrate. The second substrate 3 is a base substrate of a color filter on array type (COA, e.g., a color filter attached on an array substrate) substrate.

This embodiment provides the upper polarizing units 5 with various structures and disposes the upper polarizing units 5 with the various structures one-to-one correspondence with the sub-pixels 4 with the multiple colors. Structures of the upper polarizing units 5 configured according to the corresponding sub-pixels 4 with different colors can increase the light transmittance of each color (light transmittance of different colors means different wavelength ranges of light). Additionally, through the sub-pixels 4 whose colors are same as the colors of the corresponding upper polarizing units 5, it is ensured that the light transmittance of sub-pixels 4 whose color is the same as the color of the corresponding upper polarizing units 5 is increased. The light transmittance of each monochrome (such as red, green, and blue) is also increased. Therefore, transmittance of each monochromatic transmitted light of the display panel (such as the three primary colors of red, green, and blue) is higher, thereby increasing an overall light transmission effect of the display panel. The transmission axes of the lower polarizing units 6 and the upper polarizing units 5 in the present application are perpendicular to each other, which ensures a good polarization effect. The lower polarizing units 6 and the corresponding upper polarizing units 5 have same structure. Therefore, the lower polarizing units 6 with various structures can increase the transmittance of light sources with different wavelength ranges, so that the light sources with different wavelength ranges have higher transmittance when passing through the lower polarizing units, which is beneficial for increasing the overall light transmission effect of the display panel 1.

In an embodiment, projections of the upper polarizing units 5 and the lower polarizing units 6 in a direction perpendicular to the display panel 1 completely cover projections of the corresponding sub-pixels 4 in the direction perpendicular to the display panel 1. Specifically, any two adjacent upper polarizing units 5 do not overlap each other. Any two adjacent lower polarizing units 6 do not overlap each other. Any two adjacent lower polarizing units 6 are adjacent to each other.

In this embodiment, the lower polarizing units 6 can cover an entire display region, which ensures that the light sources at different positions irradiating to a direction of the second substrate 3 can irradiate to the lower polarizing units 6 and are converted into polarized light by the lower polarizing units 6, thereby preventing optical crosstalk from being generated when the light sources directly enters the liquid crystal layer 7. The upper polarizing units 5 cover an entire region where the sub-pixels 4 are located, which ensures that modulated polarized light irradiated from the liquid crystal layer 7 to the sub-pixels 4 with the multiple colors has the corresponding upper polarizer for analysis, hereby ensuring a display effect of the display panel 1.

In an embodiment, the sub-pixels 4 with the multiple colors include a red sub-pixel 9, a green sub-pixel 10, and a blue sub-pixel 11. The upper polarizing units 5 with the various structures include a first upper polarizing unit 12, a second upper polarizing unit 13, and a third upper polarizing unit 14. The first upper polarizing unit 12 is disposed corresponding to the red sub-pixel, and transmittance of red transmitted light through the first upper polarizing unit 12 is greater than transmittance of green transmitted light and blue transmitted light through the first upper polarizing unit 12. The second upper polarizing unit 13 is disposed corresponding to the green sub-pixel 10, and transmittance of green transmitted light through the second upper polarizing unit 13 is greater than transmittance of red transmitted light and blue transmitted light through the second upper polarizing unit 13. The third upper polarizing unit 14 is disposed corresponding to the blue sub-pixel 11, and transmittance of blue transmitted light through the third upper polarizing unit 14 is greater than transmittance of red transmitted light and green transmitted light through the third upper polarizing unit 14.

In this embodiment, the first upper polarizing unit 12, the second upper polarizing unit 13, and the third upper polarizing unit 14 are configured according to the red transmitted light, the green transmitted light, and the blue transmitted light, which makes the transmitted light of each color through the upper polarizing units 5 corresponding to the sub-pixels 4 whose color is the same as the color of the upper polarizing units 5 have higher transmittance than the transmitted light of other colors. That is, different upper polarizing units 5 are configured for transmitted light in different wavelength ranges, so that the upper polarizing units 5 of different structures have different wavelength levels. On the basis of ensuring the polarization effect, it also ensures that the three monochromatic transmitted lights of red, green, and blue colors of the display panel 1 have higher transmittance, which increases the overall light transmission effect of the display panel 1.

Figure 3:
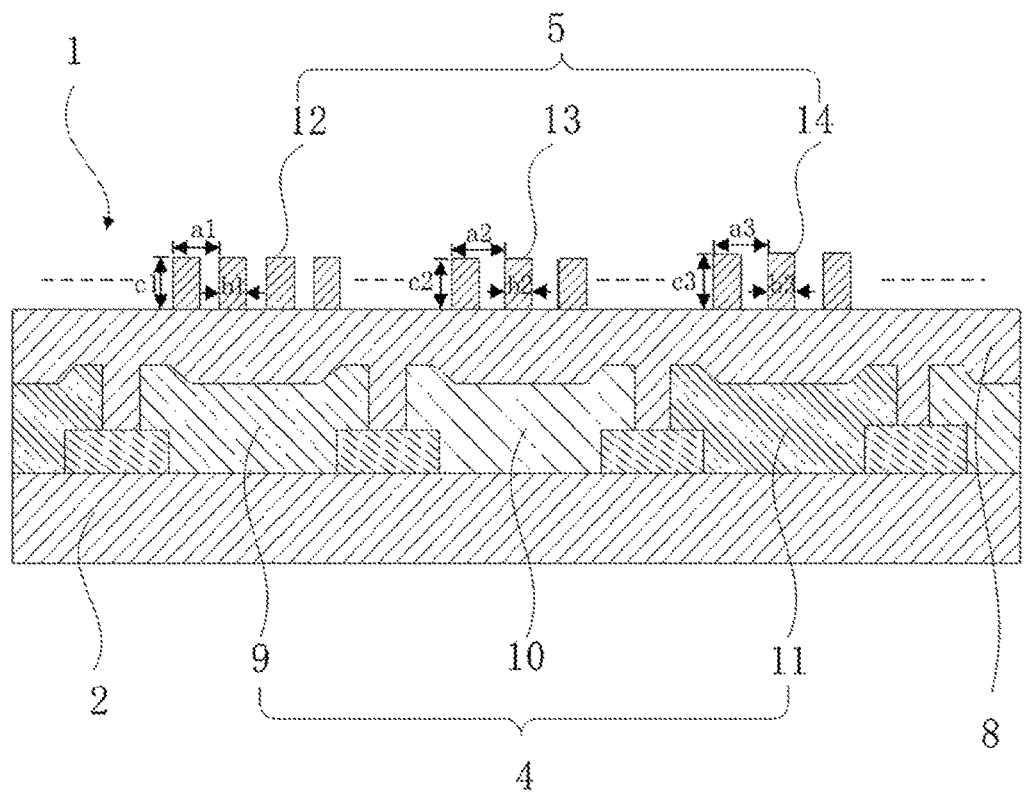
FIG. 3 is a partial structural diagram of another display panel provided by an embodiment of the present application.
Figure 4:
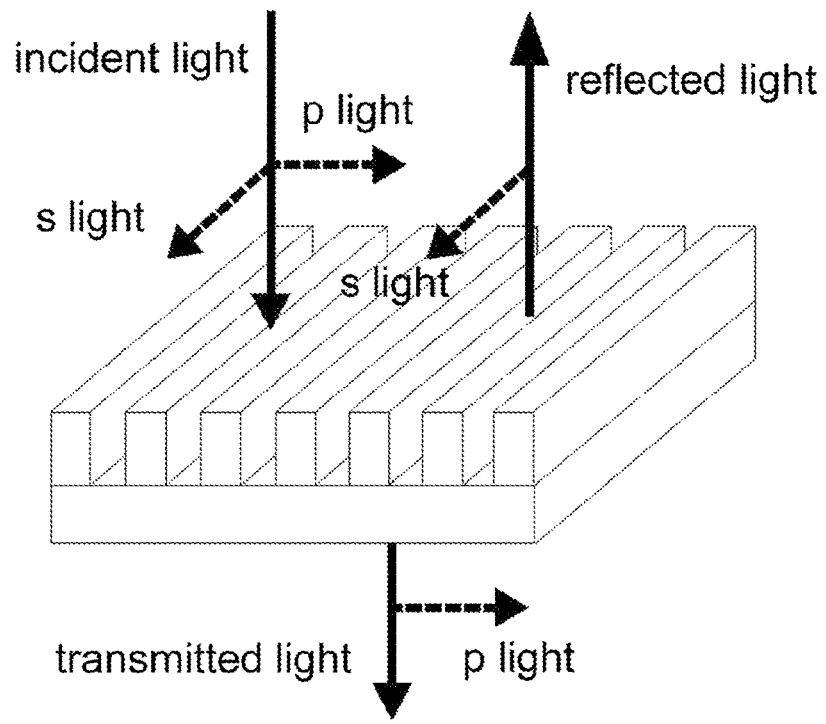
FIG. 4 is a schematic diagram of a polarization principle of subwavelength nano-grating provided by an embodiment of the present application.
Figure 5:
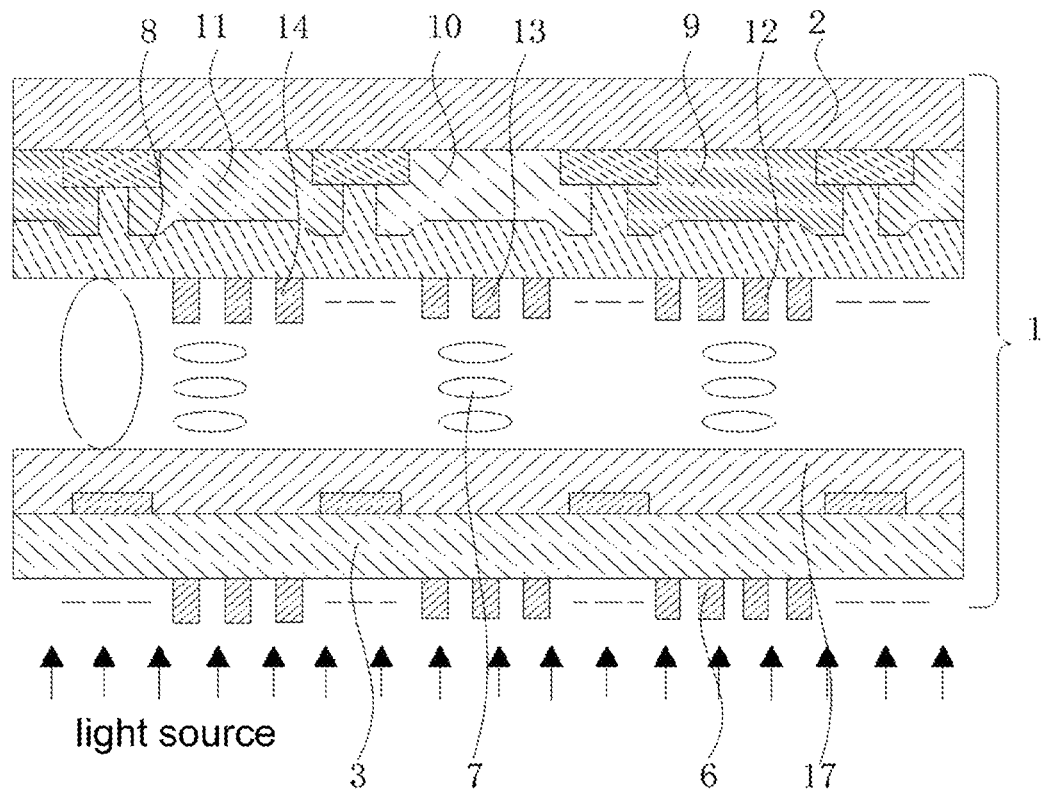
FIG. 5 is a structural diagram of another display panel provided by an embodiment of the present application.

As shown in FIGS. 3 to 5, an embodiment of the present application further provides a display panel 1, which is different from the above embodiments in that the upper polarizing units 5 and the lower polarizing units 6 have a subwavelength nano-grating structure. The upper polarizing units 5 with the various structures are different in at least one of a grating period, a grating duty ratio (ratio of grating width to grating period), or a grating height.

Specifically, material of the subwavelength nano-grating structure includes a metal or a metal oxide, such as aluminum.

Specifically, material of the subwavelength nano-grating structure is manufactured by nanoimprint lithography technology.

Specifically, the grating period ranges from 120 to 500 nanometers, the grating duty ratio ranges from 0.3 to 0.7, and the grating height ranges from 100 to 300 nanometers.

In this embodiment, as shown in FIG. 4, the subwavelength nano-grating structure has characteristics of high selectivity that allows light component of transverse magnetic (TM) polarized light (its direction of polarization is perpendicular to a direction of wire grids, which is p light) and reflects light component of transverse electric (TE) polarized light (its direction of polarization is parallel to a direction of wire grids, which is s light). The subwavelength nano-grating structure is used as a polarizer has a good polarization effect. This embodiment configures the subwavelength nano-grating structure with better monochromatic transmittance and extinction ratio as the upper polarizing units 5 for sub-pixels 4 of different colors. On the basis of ensuring the polarization effect, it also ensures that transmitted light of each color has higher transmittance when passing through the upper polarizing units 5 corresponding to the sub-pixel 4 whose color is the same as the color of the upper polarizing units 5, which increases the overall light transmission effect of the display panel 1.

In an embodiment, as shown in FIG. 3, the sub-pixels 4 with the multiple colors include the red sub-pixel 9, the green sub-pixel 10, and the blue sub-pixel 11. The upper polarizing units 5 with the various structures include the first upper polarizing unit 12, the second upper polarizing unit 13, and the third upper polarizing unit 14. The first upper polarizing unit 12, the second upper polarizing unit 13, and the third upper polarizing unit 14 include the subwavelength nano-grating structure. A grating period (a1) of the first upper polarizing unit 12 is 200 nanometers, a grating duty ratio thereof is 0.6 (a corresponding grating width b1 is 120 nanometers), and a grating height (c1) thereof is 260 nanometers. A grating period (a2) of the second upper polarizing unit 13 is 200 nanometers, a grating duty ratio thereof is 0.5 (a corresponding grating width b2 is 100 nanometers), and a grating height (c2) thereof is 260 nanometers. A grating period (a3) of the third upper polarizing unit 14 is 200 nanometers, a grating duty ratio thereof is 0.5 (a corresponding grating width b3 is 100 nanometers), and a grating height (c3) thereof is 270 nanometers.

Specifically, transmittance of red transmitted light through the first upper polarizing unit 12 is greater than transmittance of green transmitted light and blue transmitted light through the first upper polarizing unit 12. Transmittance of green transmitted light through the second upper polarizing unit 13 is greater than transmittance of red transmitted light and blue transmitted light through the second upper polarizing unit 13. Transmittance of blue transmitted light through the third upper polarizing unit 14 is greater than transmittance of red transmitted light and green transmitted light through the third upper polarizing unit 14.

In this embodiment, the first upper polarizing unit 12, the second upper polarizing unit 13, and the third upper polarizing unit 14 are different in at least one of the grating period, the grating duty ratio, or the grating height. It makes the red transmitted light, the green transmitted light, and the blue transmitted light have higher transmittance when passing through the upper polarizing units 5 corresponding to the sub-pixel 4 whose color is the same as the color of the upper polarizing units 5, which increases the overall light transmission effect of the display panel 1. When the upper polarizing units 5 with various structures are disposed on the side of the sub-pixels 4 with the multiple colors near the liquid crystal layer 7, the upper polarizing units 5 with various structures further have an effect of selectively transmitting light of different wavelength ranges (different colors), which enhances a filtering effect of the sub-pixel 4.

Figure 6:
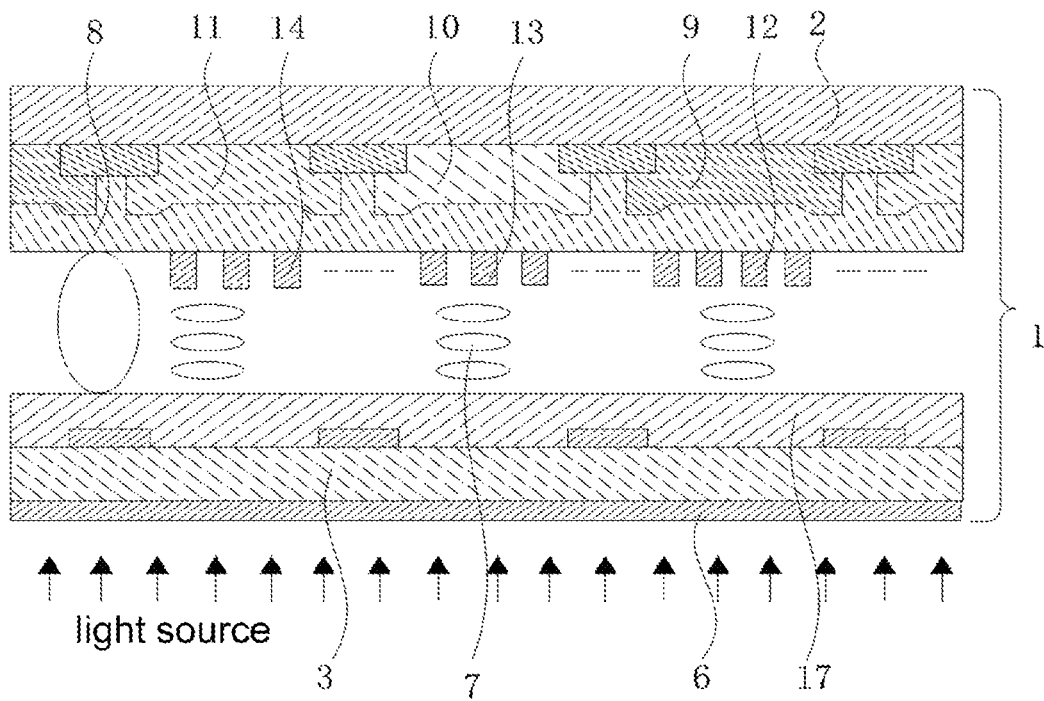
FIG. 6 is a structural diagram of another display panel provided by an embodiment of the present application.

As shown in FIG. 6, an embodiment of the present application further provides a display panel 1, which is different from the above embodiments in that structures of the lower polarizing units 6 corresponding to each of the sub-pixels 4 are a same. Specifically, structures of the lower polarizing units 6 are non-differentiated and can be ordinary polarizers or non-differentiated nano-grating polarizers, such as subwavelength nano-grating structure. Because functions of the lower polarizing units 6 and the upper polarizing units 5 are different, and a function of increasing transmittance of monochromatic transmitted light is dominated by the upper polarizing units 5, configuring different structures of the upper polarizing units 5 for sub-pixels 4 with different colors can greatly increase transmittance of each monochromatic transmitted light. On this basis, a non-differential configuration of a lower polarizer can save costs and increase manufacturing efficiency of the lower polarizing units 6.

Figure 7:
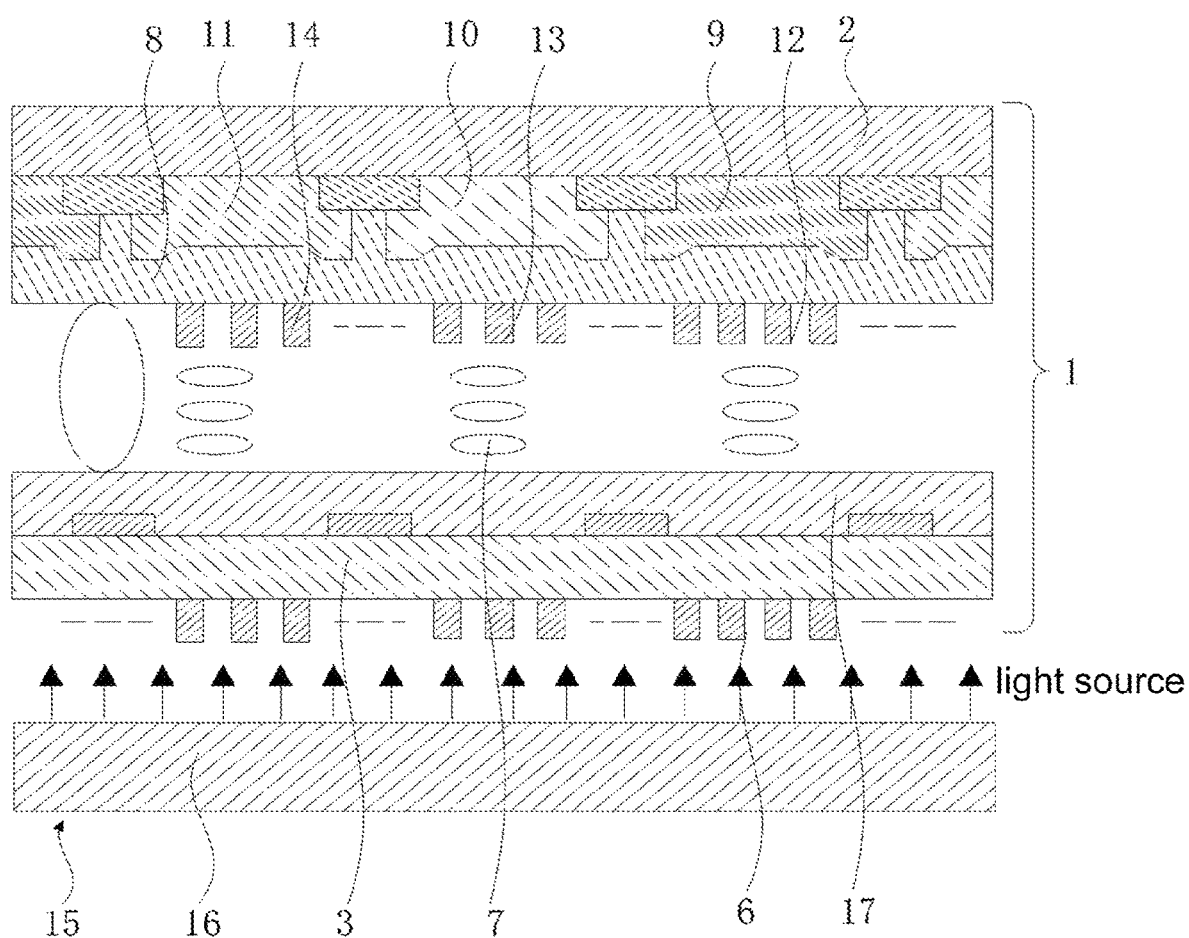
FIG. 7 is a structural diagram of a display device provided by an embodiment of the present application.

As shown in FIG. 7, an embodiment of the present application further provides a display device 15 including the above-mentioned display panel 1 and a backlight module 16 disposed corresponding to the display panel 1. The backlight module 16 is configured to provide a light source of the transmitted light to the display panel 1.

Specifically, the backlight module 16 is disposed on a side of the second substrate 3 away from the first substrate 2, which lets the light source enter from the second substrate 3 and exit from the first substrate 2.

Specifically, the lower polarizing units 6 are disposed between the second substrate 3 and the backlight module 16. A thin-film transistor (TFT) array layer 17 is disposed on the side of the second substrate 3 near the liquid crystal layer 7.

Specifically, the display panel 1 includes a color filter substrate and an array substrate. The first substrate 2 is a base substrate of a color filter substrate, and the corresponding second substrate 3 is a base substrate of an array substrate. Of course, the display panel can further be a COA type display panel 1. That is, the sub-pixels 4 are disposed on the array substrate.

In this embodiment, because the lower polarizing units 6 selectively allow the light component of the TM polarized light (its direction of polarization is perpendicular to a direction of wire grids, which is p light) and reflect the light component of the TE polarized light (its direction of polarization is parallel to a direction of wire grids, which is s light). The lower polarizing units 6 are disposed on a side of the second substrate 3 near the backlight module 16, so that the TE polarized light reflected by the lower polarizer can be reflected to the backlight module 16. The reflected TE polarized light is depolarized by the backlight module 16 and re-reflects to the lower polarizing units 6 by a reflective layer in the backlight module 16, which realizes a repeated use of light energy and enhances utilization efficiency of backlight light.

Although the present application has been disclosed above by the preferred embodiments, the preferred embodiments are not intended to limit the application. One of ordinary skill in the art, without departing from the spirit and scope of the present application, can make various modifications and variations of the present application. Therefore, the scope of the claims to define the scope of equivalents.

What is claimed is:

1. A display panel, comprising a first substrate and a second substrate opposite to each other, sub-pixels with multiple colors disposed on a side of the first substrate close to the second substrate, a protective layer disposed on a side of the sub-pixels close to the second substrate, upper polarizing units with various structures and lower polarizing units with various structures;
   wherein the upper polarizing units with the various structures and the lower polarizing units with various structures are disposed in one-to-one correspondence with the sub-pixels with the multiple colors, and the upper polarizing units are disposed on a side of the protective layer close to the second substrate, and the lower polarizing units are disposed on a side of the second substrate away from the first substrate.

2. The display panel as claimed in claim 1, wherein the upper polarizing units and the lower polarizing units have a same structure, and transmission axes of the upper polarizing units and the lower polarizing units are perpendicular to each other.

3. The display panel as claimed in claim 1, wherein the upper polarizing units comprise a subwavelength nano-grating structure, and the upper polarizing units with the various structures are different in at least one of a grating period, a grating duty ratio, or a grating height.

4. The display panel as claimed in claim 3, wherein the grating period ranges from 120 to 500 nanometers, the grating duty ratio ranges from 0.3 to 0.7, and the grating height ranges from 100 to 300 nanometers.

5. The display panel as claimed in claim 1, wherein projections of the upper polarizing units and the lower polarizing units in a direction perpendicular to the display panel completely cover projections of the corresponding sub-pixels in the direction perpendicular to the display panel.

6. The display panel as claimed in claim 1, wherein the sub-pixels with the multiple colors comprise a red sub-pixel, a green sub-pixel, and a blue sub-pixel;
   the upper polarizing units with the various structures comprise a first upper polarizing unit, a second upper polarizing unit, and a third upper polarizing unit;
   the first upper polarizing unit is disposed corresponding to the red sub-pixel, and transmittance of red transmitted light through the first upper polarizing unit is greater than transmittance of green transmitted light and blue transmitted light through the first upper polarizing unit;
   the second upper polarizing unit is disposed corresponding to the green sub-pixel, and transmittance of green transmitted light through the second upper polarizing unit is greater than transmittance of red transmitted light and blue transmitted light through the second upper polarizing unit; and the third upper polarizing unit is disposed corresponding to the blue sub-pixel, and transmittance of blue transmitted light through the third upper polarizing unit is greater than transmittance of red transmitted light and green transmitted light through the third upper polarizing unit.

7. The display panel as claimed in claim 6, wherein the first upper polarizing unit, the second upper polarizing unit, and the third upper polarizing unit comprise a subwavelength nano-grating structure;

a grating period of the first upper polarizing unit is 200 nanometers, a grating duty ratio thereof is 0.6, and a grating height thereof is 260 nanometers;

a grating period of the second upper polarizing unit is 200 nanometers, a grating duty ratio thereof is 0.5, and a grating height thereof is 260 nanometers; and a grating period of the third upper polarizing unit is 200 nanometers, a grating duty ratio thereof is 0.5, and a grating height thereof is 270 nanometers.

8. The display panel as claimed in claim 3, wherein material of the subwavelength nano-grating structure comprises a metal or a metal oxide.

9. The display panel as claimed in claim 1, further comprising a liquid crystal layer, and a thin-film transistor (TFT) array layer;

wherein the TFT array layer is disposed on a side of the second substrate near the first substrate, and the liquid crystal layer is disposed between the upper polarizing units and the TFT array substrate.

10. A display panel, comprising a first substrate and a second substrate opposite to each other, sub-pixels with multiple colors disposed on a side of the first substrate close to the second substrate, a protective layer disposed on a side of the sub-pixels close to the second substrate, upper polarizing units with various subwavelength nano-grating structures, and lower polarizing units with various subwavelength nano-grating structures;

wherein the upper polarizing units with the various subwavelength nano-grating structures are different in at least one of a grating period, a grating duty ratio, and a grating height;

the upper polarizing units with the various subwavelength nano-grating structures are disposed in one-to-one correspondence with the sub-pixels with the multiple colors to increase transmittance of transmitted light of each color through the upper polarizing units corresponding to the sub-pixels whose color is the same as the color of the upper polarizing units;

the lower polarizing units with the various subwavelength nano-grating structures are disposed in one-to-one correspondence with the sub-pixels with the multiple colors, the lower polarizing units and corresponding upper polarizing units have a same structure, transmission axes of the upper polarizing units and the lower polarizing units are perpendicular to each other, and the lower polarizing units are disposed on a side of the upper polarizing units away from the sub-pixels; and the upper polarizing units are disposed on a side of the protective layer close to the second substrate, and the lower polarizing units are disposed on a side of the second substrate away from the first substrate.

11. A display device, comprising a display panel and a backlight module disposed corresponding to the display panel;

wherein the backlight module is configured to provide a light source of the transmitted light to the display panel;

the display panel comprises a first substrate and a second substrate opposite to each other, sub-pixels with multiple colors disposed on a side of the first substrate close to the second substrate, a protective layer disposed on a side of the sub-pixels close to the second substrate, upper polarizing units with various structures and lower polarizing units with various structures; and the upper polarizing units with the various structures and the lower polarizing units with various structures are disposed in one-to-one correspondence with the sub-pixels with the multiple colors, the upper polarizing units are disposed on a side of the protective layer close to the second substrate, and the lower polarizing units are disposed on a side of the second substrate away from the first substrate.

12. The display device as claimed in claim 11, further comprising lower polarizing units with various structures;

wherein the lower polarizing units with the various structures are disposed one-to-one correspondence with the sub-pixels with the multiple colors; and wherein the upper polarizing units and the lower polarizing units are respectively disposed on two sides of corresponding sub-pixels; or wherein the upper polarizing units and the lower polarizing units are respectively disposed on a same side of corresponding sub-pixels, and the upper polarizing units are disposed near the sub-pixels.

13. The display device as claimed in claim 11, wherein structures of the upper polarizing units and the lower polarizing units are a same, and transmission axes of the upper polarizing units and the lower polarizing units are perpendicular to each other.

14. The display device as claimed in claim 11, wherein the upper polarizing units comprise a subwavelength nano-grating structure, and the upper polarizing units with the various structures are different in at least one of a grating period, a grating duty ratio, or a grating height.

15. The display device as claimed in claim 12, wherein the lower polarizing units are disposed near the backlight module.

* * * * *